Aug. 14, 1951  J. L. SOLOMON  2,564,347
ELECTRONIC CONTROL CIRCUIT
Filed March 28, 1946
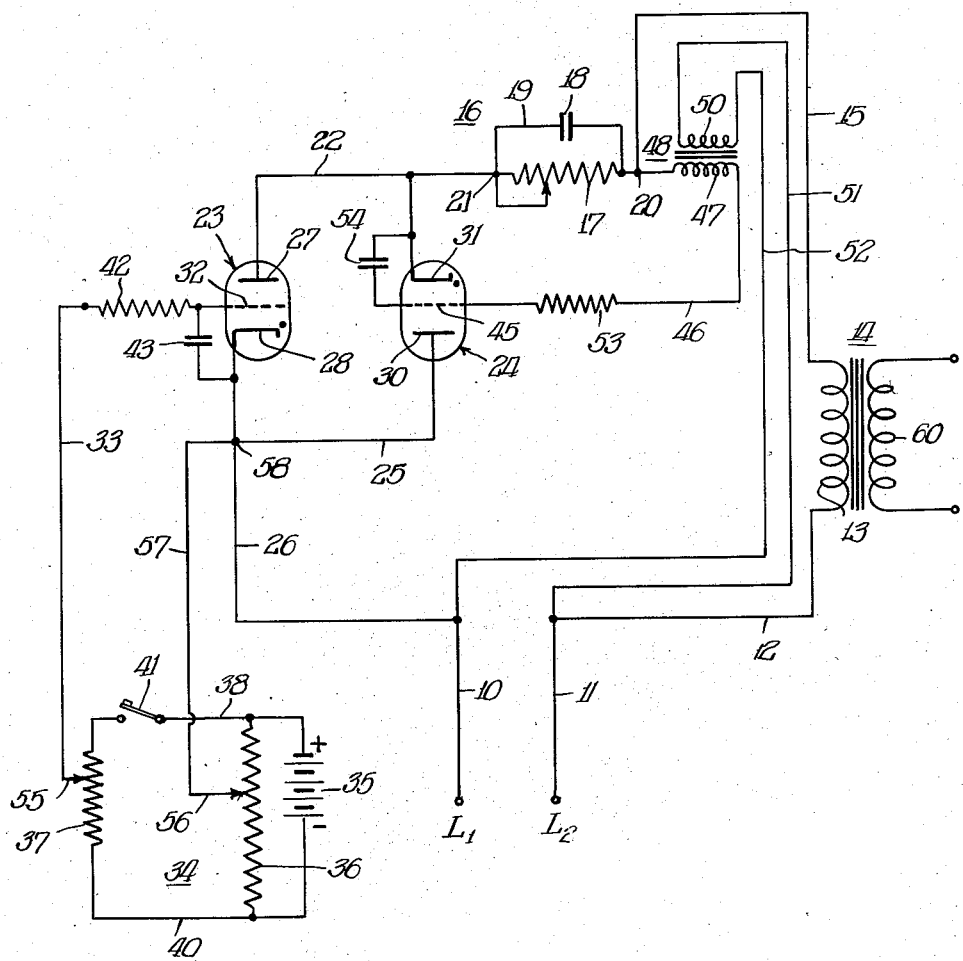
INVENTOR.
Julius L. Solomon,
BY Patented Aug. 14, 1951

2,564,347

UNITED STATES PATENT OFFICE 2,564,347

ELECTRONIC CONTROL CIRCUIT

Julius L. Solomon, Chicago, Ill., assignor to Welding Research, Inc., Chicago, Ill., a corporation of Illinois Application March 28, 1946, Serial No. 657,884

4 Claims. (Cl. 250—27)

1

The invention relates to a system for supplying current from a source to a load through electric discharge valves and has reference more particularly to improved circuit control means for controlling passage of said current.

The control circuit of the invention has application to that type of welding systems where an impulse of current from an alternating current source is passed through a welding transformer to effect the desired weld. In such welding systems electric discharge valves are employed since they are capable of accurate control and current impulses can be supplied to the load circuit of a duration measured in cycles of the supply line frequency.

Accordingly, an object of the invention resides in the provision of a control system wherein current is passed from a source to a load by a pair of inversely connected electric discharge valves and which have combined therewith an improved electric control circuit whereby the valves are alternately conductive with the firing of the second valve taking place automatically and being conditioned upon current flowing through the first valve.

Another object of the invention resides in the provision of a pair of electric discharge valves inversely connected for supplying alternating current from a source to a load with grid controlling means for said valves having improved operation whereby the conductivity of the second valve is dependent on current flow through the first and wherein the said second valve is thus conductive for passing the full negative half cycle of current for each positive half cycle or part thereof passed by the first valve.

Another object is to provide circuit control means for translating apparatus employing electric discharge valves connected in anti-parallel between the source and the load, wherein said circuit control means incorporates a phase shift circuit for shifting the phase of the voltage across the load with respect to the alternating current source and wherein said phase shift circuit provides control means controlling the conductivity of one of said valves.

In the commercial use of the control circuit of the invention, as in welding systems and the like for supplying power from a source to a load, it is possible to insure passage of the current in steps of even cyclic duration. Such operation may be accomplished merely by rendering the first valve conductive at the beginning of a positive half cycle. The full positive half cycle will thus be passed to the load and the circuit automatically renders the second valve conductive to pass the negative half cycle so that current flow will continue in increments of a full cycle until the valves are rendered non-conductive by opening the switch notwithstanding the fact that the switch may have been closed for a period of time which is not a multiple of one complete cycle.

With these and various other objects in view, the invention may consist of certain novel features of construction and operation, as will be more fully described and particularly pointed out in the specification, drawings and claims appended hereto.

In the drawing which illustrates an embodiment of the device and wherein like reference characters are used to designate like parts the figure is a diagrammatic view showing an embodiment of the invention.

The source of alternating current is indicated by $L_1$—$L_2$, the same comprising the respective terminals of said source and which are electrically connected in a conventional manner to conductors 10 and 11. Conductors 11 and 12 electrically connect with one terminal of the primary winding 13 of the transformer 14. The other terminal of said primary winding is electrically connected by conductor 15 to a phase shifting circuit 16 comprising a resistance-capacitor network and including the resistance 17 and the condenser 18 which is connected across the terminals of said resistance by the conductor 19. Said conductor 15 has connection with the resistance-capacitor network at one end thereof as at 20. The other end 21 of said phase shifting circuit 16 is electrically connected by conductor 22 to a pair of electric discharge valves indicated in their entirety by 23 and 24. Said valves are of the gas filled grid controlled type and are inversely connected between conductor 22 and conductor 25, the latter connecting with conductor 26 which completes the power circuit through the transformer primary 13 providing the load. Conventional sixty cycle alternating current from the supply line will therefore flow through the load circuit 13 under control of the reversely connected electric discharge valves. Said valves each comprise an anode or plate, a cathode and a grid. When the valves are fired by controlling the potential on the grid of the same it is understood that they will transmit current during the half cycle when their plate is positive. Since the valves 23 and 24 are connected inversely or in anti-parallel it will be seen that valve 23 has its plate 27 connected to conductor 22 and its cathode 28 connected to conductor 25, whereas the plate 30 of valve 24 is connected to conductor 25 with its cathodes 31 having connection to conductor 22.

The grid 32 of valve 23 is electrically connected through conductor 33 with the grid bias switching means indicated by numeral 34, the same consisting of a battery 35 and resistance elements 36 and 37 connected in parallel by conductors 38 and 40. A switch 41 is located in conductor 38 by means of which the potential on the grid can be varied from positive to negative as will be more particularly described in detail. The grid resistor 42 is in series with the grid 32, and the condenser 43 is electrically connected across grid 32 and cathode 28 of said tube 23.

The grid 45 of valve 24 is electrically connected by conductor 46 to one terminal of the secondary circuit 47 of an auxiliary transformer 48. The other terminal of the secondary 47 is connected to the power circuit adjacent one end of the phase shifting circuit 16 as at 20. The primary circuit 50 of the auxiliary transformer is electrically connected by conductors 51 and 52 to the alternating current source represented by the conductors 10 and 11. The primary 50 is thus connected directly across the alternating current source although any other alternating current line may be used if it is related in phase and frequency to the source. The grid resistor 53 is in series with grid 45 and the condenser 54 is connected across said grid and the cathode 31 of the valve 24.

Conductor 33 has adjustable contact along the length of resistor 37 by means of the slider 55 and a slider indicated by numeral 56 is also provided for the resistance 36, the slider having electrical connection with conductor 57 and which connects as at 58 with the power circuit at the junction of 25 and 26. With the switch 41 in open position a negative grid bias will be maintained on the grid 32, thus maintaining the valve non-conductive. It will be observed that the battery 35 has the polarity as indicated and thus the grid 32 is electrically connected through resistance element 37 with the negative end of the battery. However, the cathode 28 is held positive since it is connected through 57, slider 56 and resistance 36 with the positive end of the battery.

With switch 41 remaining open the valve 24 is also maintained non-conductive since the potential on its grid 45 is negative when its plate 30 is positive. This is accomplished by the auxiliary transformer 48 as follows. When the phase relation of the alternating current source is such as to render plate 30 positive this positive impulse will be caused to flow through primary 50 of the auxiliary transformer and will induce a voltage across the secondary 47, which, however, is phase shifted approximately 180 degrees with respect to the primary voltage so that the grid 45 is maintained negative, holding valve 24 non-conductive. When the phase relation of the alternating current source is such as to render plate 30 negative the valve 24 will not pass current under these conditions even though the potential on the grid 45 becomes positive.

When the switch 41 is closed a positive potential is applied to grid 32 of said valve 23 and if the sliders 55 and 56 are properly adjusted the potential on said grid 32 will be such that valve 23 will fire upon its plate 27 becoming positive. Assuming that the phase relation of the alternating current source is such that plate 27 becomes positive simultaneously with the switching of the potential on the grid 32 from negative to positive, then valve 23 will conduct current for the full positive half cycle, the same flowing through load 13, conductor 15, through the phase shifting circuit 16, conductor 22, valve 23 from plate to cathode, and through conductor 26 back to the line.

This flow of current through the power circuit affects the grid bias on valve 24 rendering the same positive to fire valve 24 for conducting the next negative half cycle. This action is automatic so that for each positive half cycle or part thereof passed by the first valve 23 the second valve 24 will pass the next negative half cycle. To understand the foregoing it may be explained that said current flow in the power circuit will produce a voltage drop across the resistance 17 and condenser 18 of the phase shifting circuit so that the end 21 is negative with respect to end 20. This voltage will therefore buck the voltage developed across secondary 47 with the result that the latter voltage is ineffective in maintaining a negative bias on grid 45. The potential on grid 45 is therefore positive when plate 30 becomes positive and the second valve is conductive to pass the negative half cycle for each positive half cycle or part thereof passed by valve 23.

The flow of this negative impulse is from conductor 10 through conductor 26 and 25, through valve 24 from plate to cathode, through the phase shifting circuit 16, conductor 15 and through the load 13 back to the line. The valves thus transmit current from the source to the load during both half cycles of alternating supply current and flow will continue until the valves are rendered non-conductive by opening switch 41. Operation of the control circuit of the invention to insure passage of the current in steps of even cyclic duration merely requires that switch 41 be closed during a negative cycle or at the start of a positive cycle. Such operation is assured notwithstanding the fact that the switch may have been closed for a period of time which is not a multiple of one complete cycle.

By adjustment of the potentiometer associated with the resistance 17 it is possible to phase shift the load, which is connected across the secondary 60 of the transformer 14, with respect to the supply line. In other words, the voltage across transformer 14 may be shifted in phase with respect to the voltage appearing across lines 10 and 11 by a number of degrees dependent upon the position of the slider on the variable resistor 17. Increasing the value of the resistance 17 will reduce the capacity and when the resistance is cut out entirely the capacity is a maximum. Since the phase shifting means has a series connection in the power circuit it accomplishes a dual function, one of shifting the phase of the voltage across the load with respect to the voltage of the alternating current source and the other of providing a counter-voltage upon current flow through the first valve 23 to buck the voltage across the secondary 47. As a result the second valve 24 is automatic in firing to pass the next negative half cycle as described.

The invention is not to be limited to or by details of construction of the particular embodiment thereof illustrated in the drawings, as various forms of the device will of course be apparent to those skilled in the art without departing from the spirit of the invention or the scope of the claims.

What is claimed is:

1. In a system for supplying power from a source of alternating current to a load, the combination including a first and a second electric discharge valve of the grid controlled type connected in anti-parallel between said source and the load, whereby said valves when conductive will pass the positive and negative half cycles respectively of the alternating supply current, grid biasing means in the grid-cathode circuit of the first valve for controlling the conductivity thereof, other grid biasing means for the second valve having connection with the alternating current source and producing a periodic control voltage for maintaining said valve non-conductive, said other grid biasing means having electrical connection in the grid-cathode circuit of said second valve, a resistance-capacity network in series relation with said valves and the load and also being included in the grid-cathode circuit of said second valve, said resistance-capacity network providing impedance means capable of developing a counter-voltage upon flow of current through the same due to the conductivity of said first valve, whereby said counter-voltage neutralizes the periodic control voltage to render the second valve conductive in turn, and said resistance-capacity network additionally providing phase shifting means for shifting the phase of the voltage across the load with respect to the voltage of the alternating current source.

2. In a system for supplying power from a source of alternating current to a load, the combination of an electric circuit including a pair of grid controlled electric discharge valves connected in anti-parallel between said source and the load, whereby one valve when conductive will pass the positive half cycles and the other valve when conductive will pass the negative half cycles, grid-biasing means for the first mentioned valve for controlling the conductivity thereof, transformer means energized from said source for maintaining the second mentioned valve non-conductive by means of an induced secondary voltage, and impedance means in the power circuit in series relation with said valves and the load and having electrical connection with said transformer means, said impedance means developing a voltage upon current flow in said power circuit as a result of the first mentioned valve becoming conductive for neutralizing said secondary voltage whereby the second mentioned valve is rendered conductive in turn.

3. In a control system, a source of alternating current, a power circuit including a load and a pair of electric discharge valves connected in anti-parallel between said source and the load, whereby one valve when conductive will pass the positive half cycles and the other valve when conductive will pass the negative half cycles, means controlling the conductivity of the first mentioned valve, grid biasing means for the second mentioned valve for maintaining the same non-conductive, impedance means in the power circuit and which also has a series connection in the grid-cathode circuit of said second mentioned valve, said impedance means neutralizing the grid biasing means as a result of current flow in the power circuit due to the first mentioned valve becoming conductive, whereby the second mentioned valve will pass the negative half cycle for each positive half cycle passed by the first mentioned valve, and said impedance means including a parallel resistance-capacity network having the additional function of shifting the phase of the voltage across the load with respect to the voltage of the alternating current source.

4. In a system for supplying power from a source of alternating current to a load, the combination of an electric circuit including a pair of grid controlled electric discharge valves connected in anti-parallel between said source and the load, whereby one valve when conductive will pass the positive half cycles and the other valve when conductive will pass the negative half cycles, means providing a grid biasing voltage for maintaining the first mentioned valve non-conductive, a source of periodic control voltage for maintaining the second mentioned valve non-conductive, impedance means in the power circuit and which also has a series connection in the grid-cathode circuit of said second mentioned valve, said impedance means developing a counter-voltage as a result of current flow through the same passed by the first mentioned valve for neutralizing the periodic control voltage, whereby the second mentioned valve is rendered conductive for passing the negative half cycle for each positive half cycle passed by the first mentioned valve, said impedance means comprising a resistance-capacity network having the additional function of shifting the phase of the voltage across the load with respect to the voltage of the alternating current source.

JULIUS L. SOLOMON.

REFERENCES CITED

The following references are of record in the file of this patent:

UNITED STATES PATENTS

| Number | Name | Date |
|---|---|---|
| 1,947,189 | Cockrell | Feb. 13, 1934 |
| 1,970,515 | Lord | Aug. 14, 1934 |
| 2,126,398 | Knowles | Aug. 9, 1938 |
| 2,226,375 | Gulliksen | Dec. 24, 1940 |
| 2,228,844 | Palmer | Jan. 14, 1941 |
| 2,340,077 | Pearson et al. | Jan. 25, 1944 |
| 2,359,080 | Bivens | Sept. 26, 1944 |
| 2,443,660 | Large et al. | June 22, 1948 |

FOREIGN PATENTS

| Number | Country | Date |
|---|---|---|
| 448,833 | Great Britain | June 16, 1936 |